Patented Dec. 18, 1923.

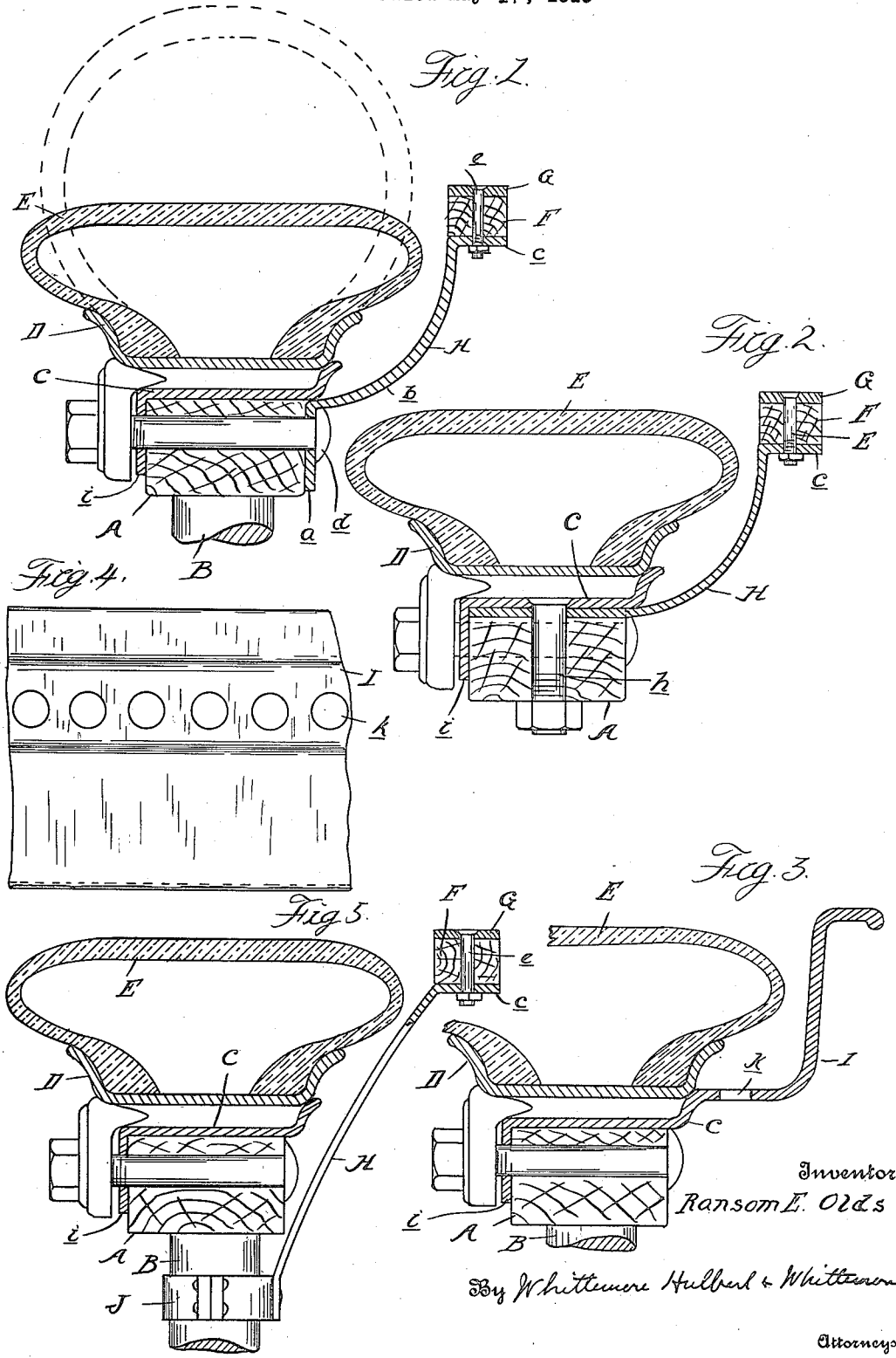

1,477,661

UNITED STATES PATENT OFFICE.

RANSOM E. OLDS, OF LANSING, MICHIGAN.

AUXILIARY TREAD FOR PNEUMATIC-TIRED VEHICLE WHEELS.

Application filed May 17, 1919. Serial No. 297,788.

*To all whom it may concern:*

Be it known that I, RANSOM E. OLDS, a citizen of the United States of America, residing at Lansing, in the county of Ingham and State of Michigan, have invented certain new and useful Improvements in Auxiliary Treads for Pneumatic-Tired Vehicle Wheels, of which the following is a specification, reference being had therein to the accompanying drawings.

The invention relates to vehicle wheels having pneumatic tires, and it is the object of the invention to provide a simple construction of auxiliary tread which in case of deflation of the tire through puncture or other cause will carry the weight of the vehicle and protect the tire from injury. To this end the invention consists in the construction as hereinafter set forth.

In the drawings—

Figure 1 is a cross-section through the rim of a vehicle wheel, showing one of the spokes in elevation and with my improvement applied thereto;

Figure 2 is a similar view of a slightly modified form of construction;

Figure 3 is a similar section through another modification;

Figure 4 is a plan view of the auxiliary tread shown in Figure 3 with the tire and its rim omitted; and Figure 5 is a section similar to Figure 1, of another modification of my invention.

My invention can be applied to any of the ordinary vehicle wheels now used on automobiles, and I have shown it as applied to the ordinary wheel with wooden felly and wooden spokes: A being the felly; B the spoke; C the felly-band; D a demountable tire-holding rim; and E a pneumatic tire thereon. In Figure 1 the tire is shown in dotted lines in its inflated condition and in full lines in its deflated condition.

The preferred form of application of my improvement I have illustrated in Figure 1, in which I form an endless ring, F, preferably of wood, having a metallic facing, G, secured thereto; these two parts together forming the endless ring or wheel which I have referred to as the auxiliary tread for the main wheel. This ring I preferably secure by means of arms, H, each having a vertical portion, $a$, a lateral portion, $b$, and a final horizontal portion, $c$. The vertical portion $a$ is apertured and by means of the bolt, $d$, is preferably secured to the felly of the wheel. The horizontal portion $c$ is provided with an aperture through which the bolt $e$, may pass to secure the ring, or auxiliary tread, to the arm H. These arms are of such outward projection and of such lateral projection that they will hold the tread at a point so that it will not contact with the ground when the pneumatic tire remains inflated to its proper tension and so that when it is deflated the lateral spread of the tire will not overlap the auxiliary tread—as shown in full lines in the drawings. Furthermore, these arms are resilient for the purpose of yieldably carrying the load.

In case the tire E becomes punctured or deflated beyond its normal, the auxiliary tread will come into operation and the load will be carried upon that tread without danger of pinching or rim-cutting the pneumatic tire—as would be the case if the load was carried directly upon that tire in its deflated condition.

I find also that in going over rutted roads with this device the auxiliary tread will catch on the side of the rut and assist very materially in getting the wheel out of the rut—when that is desired.

It will be noticed that I have put this auxiliary tread on the inside of the wheel, so that it will not interfere in any way with the putting on or taking off of the demountable rim ordinarily employed in automobiles. This device may be left permanently in position, which is the preferred construction, or it may, if desired, be carried as a spare tread and put on only for those wheels upon which the tire has become deflated or punctured.

In Fig. 2 I have shown the arms H as having portions $i$ extending between the rim C and the felly and secured in position by bolts, $h$.

In Fig. 3 I have shown the support for the auxiliary rim as consisting of an extension I of the rim C, and in this case the tread may be formed integrally with the parts C and I. In this construction, I prefer to punch out portions such as $k$ in the part I, to lighten the device.

In Fig. 5 I have shown the arms H as extending down past the felly and secured in position by clamps J fastened to the spokes.

What I claim as my invention is:

The combination with a vehicle wheel having a felly and a surrounding felly band and adapted to carry a pneumatic tire, of an auxiliary tread member having its outer periphery of greater diameter than the wheel and of less diameter than the pneumatic tire thereon, a support for said auxiliary tread member having a portion between said felly band and felly, and means passing through said felly band, portion of the auxiliary tread member support between said felly band and felly, and felly for securing said auxiliary tread member in place relative to the wheel.

In testimony whereof I affix my signature.

RANSOM E. OLDS.